Sept. 11, 1928.
S. A. STAEGE
1,684,077
SPEED REGULATOR SYSTEM
Filed April 12, 1921
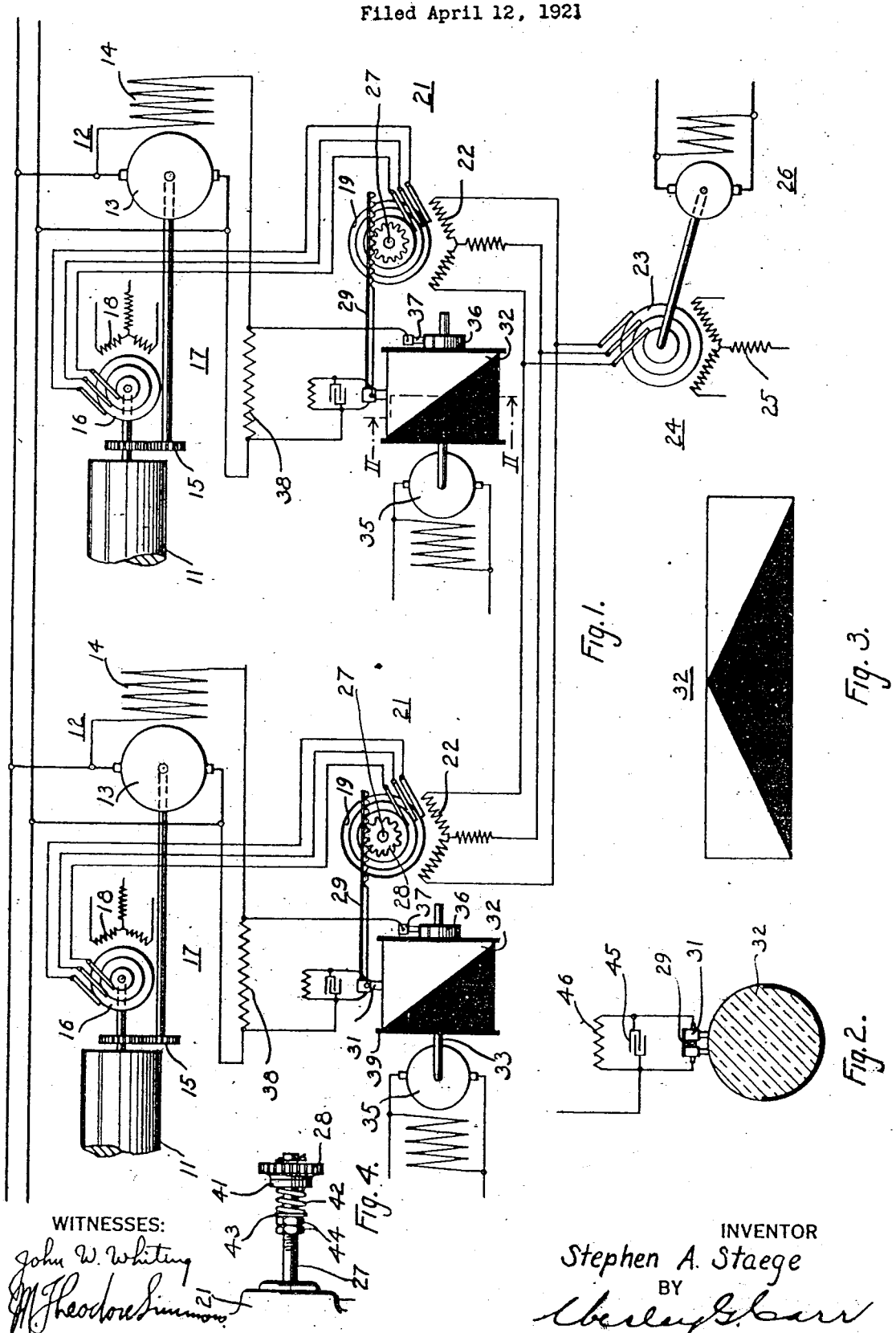
WITNESSES:
John W. Whiting
M. Theodore Simmons
INVENTOR
Stephen A. Staege
BY
Charles G. Carr
ATTORNEY Patented Sept. 11, 1928.

1,684,077

UNITED STATES PATENT OFFICE.

STEPHEN A. STAEGE, OF PITTSBURGH, PENNSYLVANIA, ASSIGNOR TO WESTINGHOUSE ELECTRIC & MANUFACTURING COMPANY, A CORPORATION OF PENNSYLVANIA.

SPEED-REGULATOR SYSTEM.

Application filed April 12, 1921. Serial No. 460,838.

My invention relates to speed-regulator systems and it has special relation to systems adapted to maintain a substantially constant speed ratio between a plurality of moving members.

One object of my invention is to provide a speed-regulator system of the above-indicated character which shall be efficient in operation and simple and inexpensive in construction.

In my prior Patent No. 1,553,406, Sept. 15, 1925, is described a speed-regulator system of the above-indicated character wherein each set of rotatable members is propelled by a variable-speed motor. Each rotatable member operates a frequency changer that is electrically connected to one winding of an auxiliary frequency changer. The other winding of the auxiliary frequency changer is connected to a frequency changer that is common to all of the rotatable members and is adapted to supply a constant frequency. The auxiliary frequency changer is, in effect, an electric differential or a differential relay.

The present invention contemplates utilizing the electric differential to control the operation of a co-operating rotary contactor, or commutator, and brush apparatus to govern the effective value of a resistor in circuit with the propelling motor. Specifically, the present invention includes an independently rotated commutator cylinder and a co-operating brush that is mounted upon a rack engaging with a pinion on the shaft of the differential machine. Thus, the location of the brush upon the commutator cylinder will determine the amount of time that the resistor is included in, and excluded from, the circuit of the propelling motor. Provision is also made for preventing sparking and arcing when the circuit through the commutator is opened and closed, as hereinafter more fully described.

Reference may now be had to the accompanying drawing, wherein Fig. 1 is a diagrammatic illustration of circuits and apparatus embodying my invention, as applied to a plurality of rotatable members;

Fig. 2 is a side elevation of the rotary contactor, or commutator, apparatus, partly in section, in the plane indicated by the line II—II of Fig. 1;

Fig. 3 is a development of the commutator cylinder; and

Fig. 4 is a detail view, illustrating the frictional connection between the shaft of the differential machine and the pinion gearwheel.

Since the apparatus for each roll unit is similar, the present invention will be described with reference to a single set of rotatable members, and the illustrated duplicate parts will be given like reference numerals.

A set of rotating members is diagrammatically indicated by a roll 11, which is adapted to be driven by a propelling motor 12, having an armature 13 and a field-magnet winding 14, through suitable gearing 15. The roll 11 drives the rotor 16 of a frequency changer 17 having a stator 18 which is energized from any suitable source of power.

The rotor, or secondary winding 16 is electrically connected to the rotor, or secondary winding 19 of an auxiliary, or second frequency changer 21. The primary winding 22 of the second frequency changer is electrically connected to the secondary winding 23 of a frequency changer 24, which is common to all of the roll units. Frequency changer 24 has a primary winding 25, which is energized from any suitable source of power, preferably the same as that to which stator 18 is connected. The secondary winding 23 is adapted to be driven from a motor 26 in any suitable or well-known manner to supply a constant frequency to the various frequency changers 21.

Accordingly, so long as the frequencies applied to the secondary winding 19 and the primary winding 22 of the auxiliary frequency changer 21 are identical, there will be no movement of the shaft of this frequency changer. However, any variations in frequency between these windings will be indicated by the rotation of the shaft 27 of the frequency changer 21. Accordingly, this frequency changer becomes, in its operation, an electrical differential machine.

Mounted upon the shaft 27 of the electric differential 21 is a pinion 28, which meshes with a rack 29. Rack 29 has mounted on one end thereof a pair of brushes 31, shown in detail in Fig. 2, and which will be hereinafter more fully described.

Co-operating with the brushes 31 is a rotary contactor drum, or commutator cylinder 32, which is mounted upon a shaft 33 of an auxiliary driving motor 35. Also mounted upon the shaft 33 is a slip-ring 36, which has a brush 37 co-operating therewith, and is in electrical engagement with the metallic portion of the commutator cylinder 32.

Included in the circuit of the field-magnet winding 14 of the propelling motor 12 is a resistor 38. Brush 31 is connected to one side of the resistor 38, and brush 37 is connected to the opposite side thereof. Accordingly, when the brush 31 is in engagement with the metallic portion of the commutator cylinder 32, a shunt circuit is completed about the resistor 38.

The development of the rotary contactor drum, or commutator cylinder, 32 is indicated in Fig. 3. From this development, it will be apparent that, with the brush 31 located substantially in the central position on the commutator cylinder, as indicated in Fig. 1, the resistor 38 will be included in the circuit of the shunt field-magnet winding 14 50% of the time and excluded from the circuit fifty percent of the time. Hence, under normal conditions, this position may be assumed to be correct for maintaining the speed of the propelling motor substantially constant, so that the respective frequencies applied to the windings 19 and 22 of the differential machine 21 will be equal.

Since the position of the brush on the commutator cylinder is determined by the rotative movement of the shaft of the differential machine, every change of load on the motor to be controlled will be indicated by a different position of the brush on the commutator cylinder. Consequently, the regulating effect may be accomplished in infinitesimal steps, or in larger steps within the confines of the commutator cylinder, as the case may be. With this method of regulation, the speed-load curve of the controlled motor has no droop, since the differential machine may rotate in either direction and come to zero speed without returning to its initial position. Hence, the brush 31 is maintained in its corrective position so long as the condition which required its movement to the corrective position exists.

Certain of the details of the illustrated mechanism will now be considered. The commutator cylinder 32 has, on each side thereof, stop rings 39 to prevent the brushes 31 from riding off the commutator cylinder. Since occasions may arise wherein the shaft of the differential machine 21 will have a continuing rotative movement in one direction or the other, tending to move brush 31 beyond the limits of the commutator cylinder 32, provision is made for permitting the pinion 28 to slip so that there will be no breaking of parts when one of the stops 39 is encountered. Such a device is indicated in Fig. 4, wherein the pinion 28 has a disc 41 pressed into engagement therewith by means of a spring 42, which is seated at its opposite end against a washer 43 and a nut 44. This nut is adjustable upon the shaft 27 to regulate the tension of the spring 42, as indicated.

The means for preventing sparking or arcing when the circuit through the metallic part of the commutator cylinder 32 is broken comprises the pair of parallel-arranged brushes 31, which are shunted by means of a small fixed condenser 45, which, in turn, is shunted by means of a resistor 46, having a resistance value which will permit the leaking out of the condenser charge before the leading brush 31 again comes into contact with the metallic portion of the commutator cylinder.

From the foregoing, it will be apparent that a commutator or rotating circuit interrupter of the above-indicated character provides means for increasing or decreasing the value of the resistance in a motor shunt field circuit in such manner that the effective value of such resistance is proportionate to the position of the brush on the commutator cylinder. The periodicity with which the resistance is shunted may be regulated by suitably regulating the speed of the propelling motor for the commutator cylinder.

The same principle of speed regulation as above set forth may be employed in cases where a fly-ball governor becomes the actuating medium for the rack 29. However, the speed-load curve of a motor so regulated will have a drooping characteristic, since every speed of the motor will have a correspondingly different position for the brush on the face of the commutator cylinder. Other speed-controlled devices may also be used as the actuating means for the brush, but since the principles of operation will be similar to those above described, no detailed reference thereto will be made herein.

Accordingly, modifications in the system and arrangement and location of parts may be made within the spirit and scope of my invention, and such modifications are intended to be covered by the appended claims.

I claim as my invention:—

1. In a regulator system, the combination comprising a plurality of rotating members, a frequency changer operated by each of said members, an auxiliary frequency-changer, and means for controlling the speed of each rotating member, said means being jointly controlled by the auxiliary frequency changer and the frequency changer associated with each rotating member and including a circuit interrupter comprising a co-operating brush and commutator device.

2. In a regulator system, the combination comprising a plurality of rotating members, a dynamo-electric machine operated by each member, an auxiliary dynamo-electric machine, and circuit interrupter means for controlling the speed of each rotating member, said circuit interrupter means being jointly controlled by the auxiliary machine and the machine associated with each rotating member and comprising co-operating brush and commutator apparatus.

3. In a regulator system wherein a plurality of elements are required to run in fixed speed relationship and wherein a motor is arranged to drive each of a plurality of said elements, the combination of means for controlling the speed of each of a plurality of said motors comprising a commutator, a brush co-operating therewith, and means for varying the relative position of said commutator and said brush comprising a differential device provided with a winding adapted to be connected to an alternating-current source, and a common source of alternating current for supplying said alternating current windings.

4. In a speed-regulator system, the combination with a rotatable member, a propelling motor therefor provided with a field winding, a resistor in circuit with said field winding, a frequency changer operated by said member and a second frequency changer, of a differential machine having the primary and secondary windings thereof respectively energized by said frequency changer, a movable brush controlled by the operation of said differential machine, and an independently-rotated commutator device co-operating with said brush so as to control the effective value of said resistor.

5. In a speed-regulator system, the combination with a rotatable member, a propelling motor therefor provided with a field winding, a resistor in circuit with said field winding, and a constant-speed motor, of circuit-interrupting apparatus adapted to control a shunt circuit for said resistor, said apparatus comprising a commutator cylinder and co-operating brush, and means for shifting the location of said brush upon said cylinder in accordance with variations in the relative speeds of said motors.

6. In a speed-regulator system, the combination with a constant-speed motor and a motor to be regulated, of means for varying the excitation of the motor to be regulated comprising a co-operating commutator and brush circuit interrupter, and means operated by said motors and adapted to vary the action of said interrupter in accordance with variations in the relative speeds of said motors.

7. In an electric drive wherein a plurality of elements are required to run in fixed speed relationship and wherein a motor having a field winding is arranged to drive each of a plurality of said elements, the combination of means for controlling the speed of each of a plurality of said motors comprising an adjustable resistor in the circuit of the field winding of the motor, means for varying the effective value of said resistor comprising a differential device having a pair of co-operating magnetic elements, means for producing a magnetic field in one of said elements and for rotating said field in accordance with the speed of the motor, and means common to the several differential devices for producing a rotating magnetic field in the other of said elements.

8. In a regulator system wherein a plurality of elements are required to run in fixed speed relationship and wherein a motor is arranged to drive each of a plurality of said elements, the combination of means for controlling the speed of each of a plurality of said motors, and means for actuating each of said speed controlling means to maintain the speed relationship of the motors fixed comprising a member driven by the corresponding motor and a co-operating freely movable member provided with a winding adapted to be connected to an alternating-current source and a common source of alternating current for supplying each of said windings.

9. In a regulator system wherein a plurality of elements are required to run in fixed speed relationship and wherein a motor is arranged to drive each of a plurality of said elements, the combination of means for controlling the speed of each of a plurality of said motors, and means for controlling each of said speed controlling means to maintain the speed relationship of the motors fixed comprising a pair of co-operating members, one of said members being arranged to provide a rotating magnetic field and the other member being provided with a winding adapted to be connected to an alternating-current source, and a common source of alternating current for supplying said alternating current windings.

10. In a regulator system wherein a plurality of elements are required to run in fixed speed relationship and wherein a motor is arranged to drive each of a plurality of said elements, the combination of means for controlling the speed of each of a plurality of said motors comprising a commutator having wedge shaped conducting and non-conducting segments and a brush co-operating therewith to intermittently close a circuit therethrough, and means for controlling each of said speed controlling means to maintain the speed relationship of the motors fixed comprising a device provided with a winding and arranged to be differentially responsive to the speed of the corresponding motor and to the frequency of an alternating current applied to said winding, and a common source of alternating current for supplying said windings.

11. In a regulator system wherein a plurality of elements are required to run in a fixed speed relationship and wherein a motor is arranged to drive each of a plurality of said elements, the combination of means for controlling the speed of each of a plurality of said motors comprising a commutator, a brush co-operating with said commutator, and means for varying the relative position of said commutator and said brush comprising a member driven by the corresponding motor and a co-operating freely movable member provided with a winding adapted to be connected to an alternating-current source, and a common source of alternating current for supplying each of said windings.

In testimony whereof, I have hereunto subscribed my name this 29th day of March, 1921.

STEPHEN A. STAEGE.